Oct. 15, 1957 — F. R. GILL — 2,809,716
SPARK ARRESTOR FOR GROUND POWER EQUIPMENT
Filed July 11, 1955
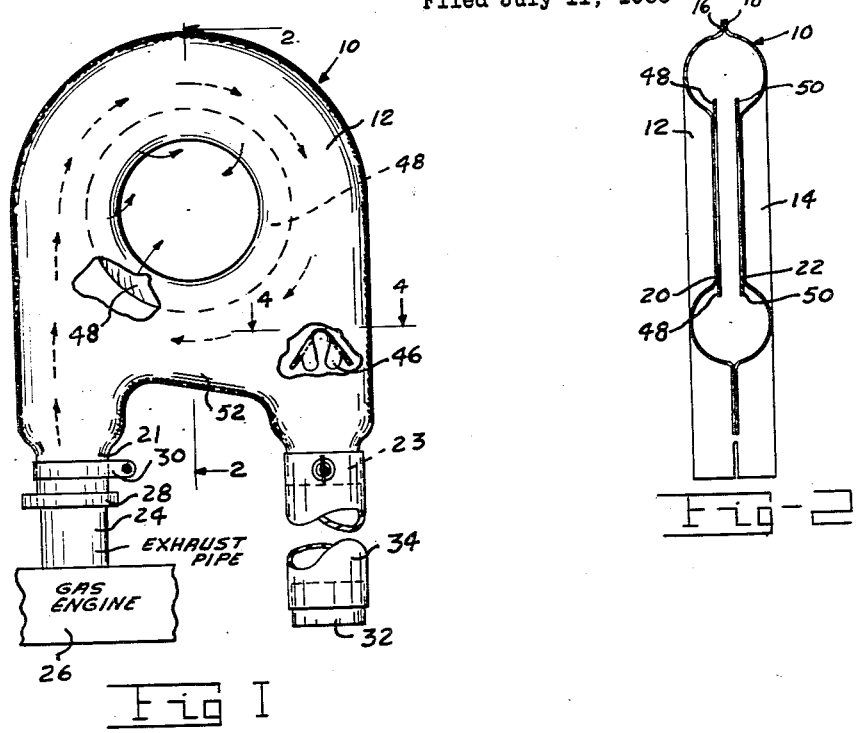
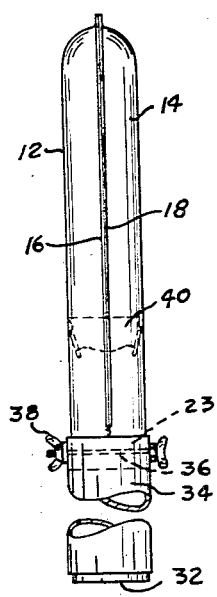
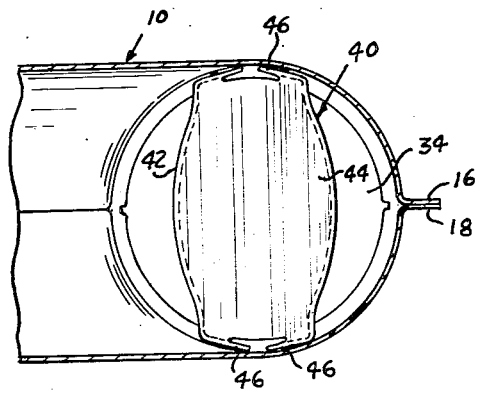
INVENTOR.
F. RAYMOND GILL
BY Ruth Codier
and Wade Kronty
ATTORNEYS 2,809,716

Patented Oct. 15, 1957

2,809,716

SPARK ARRESTOR FOR GROUND POWER EQUIPMENT

Frank R. Gill, Sacramento, Calif.

Application July 11, 1955, Serial No. 521,427

3 Claims. (Cl. 183—80)

(Granted under Title 35, U. S. Code (1952), sec. 266)

The invention described herein may be manufactured and used by or for the United States Government for governmental purposes without payment to me of any royalty thereon.

This invention relates to a spark arrestor for ground power equipment and more particularly to a safety device attachable to the exhaust systems of internal combustion engines used on ground power generator equipment.

In equipment of this kind, extreme fire hazards are likely to result from hot sparks escaping from the exhaust systems of these engines. When this sort of power generating equipment is used in or around aircraft being serviced, inside hangars, warehouses and for other maintenance operations in connection with aircraft which require the use of portable gas driven electric power generators, compressors, etc. the presence of this hazard is unusually high.

An object of the present invention is the provision of a device for attachment to the exhaust systems of such ground power equipment which will prevent the escape of these hot sparks.

A further object of the invention is the provision of a device which imparts a circular motion to the gaseous and solid material emitted from these exhausts, allowing the cooler gases to escape, while restraining and collecting the hotter solids which constitute the fire hazard.

A further object of the invention is the provision of a safety device which imparts circular motion to the products of combustion, and separates the lighter gaseous material from the heavier solid particles by centrifugal force.

A still further object of this invention is the provision of a device which is extremely durable and long-lived under conditions of strenuous and continued use.

Other objects and advantages will become apparent from the following description and accompanying drawings in which like reference characters refer to like parts in the several figures.

Fig. 1 is a front elevational view of the spark arrestor constructed in accordance with the invention, with a portion of the casing broken away to show interior structure;

Fig. 2 is a vertical sectional view taken on the line 2—2 of Fig. 1;

Fig. 3 is a side-elevational view of the device; and

Fig. 4 is an enlarged cross section taken substantially on the line 4—4 of Fig. 1 and showing a top view of the baffle member.

Referring more particularly to the drawings, 10 denotes a hollow casing, substantially toroidal in shape formed of a pair of sections 12 and 14 of aluminum, iron, steel or any other material found to be suitable and so formed as to be complementary to one another. The sections 12 and 14 are secured together in any suitable fashion. As shown in the drawing, outwardly projecting flanges 16 and 18 are provided on the sections 12 and 14, respectively. They are located on the outer circumference of the toroid and are welded or otherwise secured together. The sections 12 and 14 are also provided with depressed inwardly directed circular flanges 20 and 22, respectively. These flanges lie in substantially parallel planes and are spaced a distance from one another to provide an annular narrow exhaust passage, the distance between the planes being less than the transverse diameter of the ring portion of the toroid. They are positioned at the inner circumference of the toroid, and form a constricted circular outlet for gases at the inner circumference of said toroid. The combustion products emitted from the engine exhaust are given a swirling or circular motion and thus a continuous exhaust outlet is provided at the inner circumference of the path of travel of the exhaust gases.

The casing 10 is provided with a pair of downwardly directed cylindrical inlet and outlet members 21 and 23 respectively. These members as shown are formed as an integral part of the casing 10 but the scope of the invention is not necessarily so limited. The member 20 is adapted to be fitted over the exhaust pipe 24 of an engine 26. Any suitable means may be employed for this connection. The means shown comprises an adaptor 28 and a clamp 30.

A receptacle 32 is secured in any appropriate manner to the downwardly projecting outlet member 23. The means shown comprises a cyindrical member 34 secured to the member 23 by a bolt 36 and a wing nut 38. The lower end of the member 34 is closed by the cup or receptacle 32. A baffle member 40 is secured within the interior of the casing and is positioned above the outlet member 23. The baffle 40 is comprised of a pair of downwardly directed deflecting portions 42 and 44, and ears 46. The ears constitute means for securing the baffle in place such as by spot welding to the inner surface of the toroid portion, as shown.

A pair of flat annular members 48 and 50 are welded or otherwise secured to the flanges 20 and 22 in such a manner that their outer circumferential portions project inwardly into the toroid portion at opposite sides of the annular exhaust space and provide lips or flange or baffle members 48 and 50. The gaseous material is allowed to escape through the central opening, while the solid portions tend to be thrown back by the baffles 48 and 50.

It will be noted that the inlet 20, and the outlet 23 of the toroidal shaped casing 10 both lie tangentialy with respect to the outer circumference of the toroid, and that the circular outlet is placed at the inner circumference of the toroid. The gases which are lighter are allowed to escape at the center of the system. The products of combustion enter the system from a tangential direction, separation of light and heavy particles is effected by centrifugal force and the heavier solids leave the system in the natural tangential direction.

It will be noted also that the lower portion 52 of the casing 10, that is, the portion lying between the inlet 20 and the outlet 23 is sloped downwardly toward the outlet. Solid particles dropping out and reaching the surface will be propelled by gravity into the outlet.

The operation of the device is as follows: Solid and gaseous products of combustion emitted from the exhaust of the engine are projected upward and are deflected by the toroid portion into a circular swirl. Their path of travel is indicated by the arrows in Fig. 1. A portion of the gases escape immediately through the central opening. The flanges 48 and 50 baffle back the hot solid particles or sparks, the escape of which constitutes the fire hazard. Whatever portion of gaseous material which has not escaped, encounters the baffle 40 where it is deflected back and travels again through the system. Its forceful entrance into the receptacle is thus retarded. The solid particles are allowed to drop out and fall into the receptacle.

While the preferred practical embodiment and application of the invention has been set forth herein, variations and modifications thereof will be readily apparent to those skilled in the art, and the invention is limited only by the scope of the appended claims.

I claim:

1. A spark arrester comprising a pair of annular complementary portions fitted together to form a hollow casing of substantially toroidal shape, the inner circumferential edges of said complementary portions being spaced apart and including a pair of annular flanges lying in parallel spaced planes, the distance between said planes being less than the maximum transverse diameter of the ring portion of the toroid, said edges defining a constricted circular outlet for gases at the inner circumference of said toroid, a pair of flat annular baffle members, one secured to each of said flanges, said baffle members lying in parallel planes, the inner circumference of said annular members coinciding with the circular outlet, the outer circumferential portion of said annular members forming baffles which protrude inwardly into the hollow casing, providing baffles which allow the gases to escape from the circular outlet and retaining entrained solids in the casing.

2. A spark arrester comprising a pair of annular complementary portions fitted together to form a hollow casing of substantially toroidal shape, the inner circumferential edges of said complementary portions being spaced apart and including a pair of annular flanges lying in parallel spaced planes, the distance between said planes being less than the maximum transverse diameter of the ring portion of the toroid and forming a constricted circular outlet for gases at the inner circumference of said toroid, an inlet to said spark arrester attachable to the exhaust outlet of an engine, said inlet being tangentially placed with reference to said toroid, an outlet also tangentially located and downwardly directed, a removable receptacle attached to said outlet for the collection of solids thrown therein by centrifugal force and by gravity, an inverted V-shaped baffle member so located transversely across the axis of said outlet as to impede tangentially directed streams of gases and redirect them to circular motion, and so spaced from the walls of said casing and outlet as to allow solids impinging upon it to fall into said receptacle.

3. A spark arrester comprising a pair of annular complementary portions fitted together to form a hollow casing of substantially toroidal shape, the inner circumferential edges of said complementary portions being spaced apart and including a pair of annular flanges lying in parallel spaced planes, the distance between said planes being less than the maximum transverse diameter of the ring portion of the toroid and forming a constricted circular outlet for gases at the inner circumference of said toroid, a pair of flat annular baffle members, one secured to each of said flanges, said baffle members lying in parallel plates, the inner circumference of said annular members coinciding with the circular outlet, the outer circumferential portion of said annular members forming baffles which protrude inwardly into the hollow casing providing baffles which allow the gases to escape from the circular outlet and retaining entrained solids in the casing, an inlet to said spark arrester attachable to the exhaust outlet of an engine, said inlet being tangentially placed with reference to said toroid, an outlet also tangentially located and downwardly directed, a removable receptacle attached to said outlet for the collection of solids thrown therein by centrifugal force and by gravity, an inverted V-shaped baffle member so located transversely across the axis of said outlet as to impede tangentially directed streams of gases and redirect them to circular motion, and so spaced from the walls of said casing and outlet as to allow solids impinging upon it to fall into said receptacle.

References Cited in the file of this patent

UNITED STATES PATENTS

| | | |
|---|---|---|
| 4,069 | Grimes | June 7, 1845 |
| 416,124 | Reeves | Nov. 26, 1889 |
| 430,444 | Smith | June 17, 1890 |
| 474,490 | Walter | May 10, 1892 |
| 1,344,367 | Wickersham | June 22, 1920 |
| 2,634,822 | Coward | Apr. 14, 1953 |